United States Patent [19]
Goto et al.

[11] Patent Number: 5,144,618
[45] Date of Patent: Sep. 1, 1992

[54] OPTICAL DISC MEDIUM

[75] Inventors: Yasuyuki Goto, Atsugi; Nagaaki Koshino, Yokohama; Kenichi Utsumi, Zama; Iwao Tsugawa, Machida; Masahiro Nakada, Atsugi, all of Japan

[73] Assignee: Fujitsu Limited, Kawasaki, Japan

[21] Appl. No.: 381,321

[22] Filed: Jul. 18, 1989

[30] Foreign Application Priority Data

Jul. 22, 1988 [JP] Japan .................. 63-181699

[51] Int. Cl.⁵ .................. G11B 7/26
[52] U.S. Cl. .................. 369/284; 369/288; 369/275.2; 360/135
[58] Field of Search .................. 369/283–284, 369/280, 286, 288, 275.1, 272–273, 275.2, 275.3, 275.4; 360/131, 135

[56] References Cited

U.S. PATENT DOCUMENTS

| | | | |
|---|---|---|---|
| 4,216,501 | 8/1980 | Bell | 358/128.5 |
| 4,329,697 | 5/1982 | Bell | |
| 4,782,477 | 11/1988 | Ichihara et al. | 364/284 X |
| 4,803,660 | 2/1989 | Kobayashi et al. | 369/284 X |

FOREIGN PATENT DOCUMENTS

| | | |
|---|---|---|
| A-0237181 | 9/1987 | European Pat. Off. . |
| A-0251286 | 1/1988 | European Pat. Off. . |
| A-0260921 | 3/1988 | European Pat. Off. . |
| 57-111839 | 7/1982 | Japan . |
| 61-11952 | 1/1986 | Japan . |
| 0260921 | 9/1986 | Japan . |
| 0237181 | 2/1987 | Japan . |
| 0251286 | 6/1987 | Japan . |
| 2079031 | 1/1982 | United Kingdom . |

*Primary Examiner*—William M. Shoop, Jr.
*Assistant Examiner*—David Martin
*Attorney, Agent, or Firm*—Staas & Halsey

[57] ABSTRACT

An erasable optical disc medium on which information is recorded and read by using a laser beam, which comprises (i) a phase transition type information recording layer, (ii) an optical interference layer and (iii) an optical reflection layer, formed in this order on a transparent substrate, in such a state that a reflectance of the medium is higher before information is recorded and a reflectance of the recorded portions of the medium is lower after recording.

9 Claims, 3 Drawing Sheets

OPTICAL DISC MEDIUM

BACKGROUND OF THE INVENTION

1. Field of the Invention

The present invention relates to an optical disc medium mountable on an erasable and rewritable optical disc device, particularly a structure of an erasable and rewritable optical disc medium which can be used in place of a compact disk (CD) medium usable for reproduction.

2. Description of the Related Art

Remarkable progress has been made in the developments of optical disc devices which reproduce, record and erase information by using laser beams, and optical disc media to be used for such devices, and development of this technique has made them promising media for memory devices to be used in high performance computers. Also, as laser beam utilizing recording devices for domestic use, CD devices are now very popular, and the use of a CD-ROM as a ROM medium in personal computers is also widely spread.

In view of the state of the art, if an erasable or additionally writable optical disc medium exchangable with a standard CD medium existed, it could be used for many purposes, such as the preparation of voice information distributed in small amounts, copying voice information, backing-up a CD-ROM medium, using the CD-ROM medium as a RAM, etc., but to be utilized as described above, adequate medium structure must be adopted.

In the prior art optical discs (CD, CD-ROM, LD) used for reproduction only, information is recorded by forming irregularities on a plastic substrate, and the structure is such that information stored by forming these irregularities is reproduced by irradiating a laser beam from the substrate side. In this kind of reproduction, however, the user cannot record or write new information onto the optical disc.

Further, the optical constant of the phase transition type optical disc medium is reversibly or irreversibly changed by an irradiation of a laser beam, but in practice, the reflectance in the writing and erasing state is 40% or less. Accordingly, it is difficult to use the same in place of a CD medium for which a reflectance of 70% or more is required.

Accordingly, a CD exchangeable optical disc medium utilizing an erasable or additionally writable phase transition type has not been provided, and a utilization method such as mentioned above is not available, although, U.S. Pat. No. 4216501 discloses a pit formation type information record and Japanese Unexamined Patent Publication No. 57-111839 discloses a reversible type information record.

SUMMARY OF THE INVENTION

Accordingly, an object of the present invention is to solve the above-mentioned problems and to provide a CD exchangeable optical disc medium utilizing an erasable or additionally writable phase change.

Other objects and advantages of the present invention will be apparent from the following description.

In accordance with the present invention, there is provided an erasable and rewritable optical disc medium on which information is recorded and read by using a laser beam, which comprises (i) a phase transition type information recording layer, an optical interference layer and an optical reflection layer, formed in this order, on a transparent substrate, in such a state that a reflectance of the medium is higher before information is recorded and a reflectance of the recorded portions of the medium is lower after recording.

BRIEF DESCRIPTION OF THE DRAWING

The present invention will be better understood from the description set forth below with reference to the accompanying drawings, in which.

DESCRIPTION OF THE PREFERRED EMBODIMENTS

Figure 1:
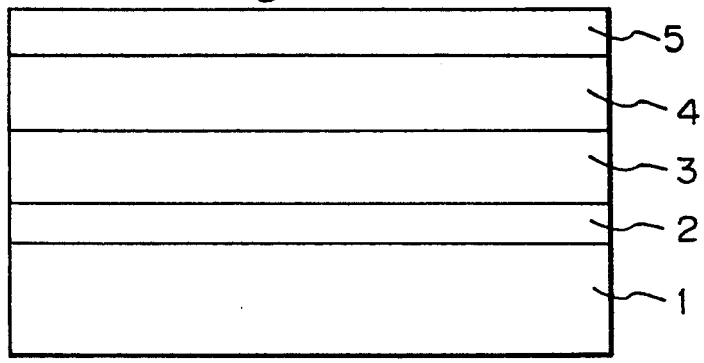
FIG. 1 shows the principle of the constitution of the optical disc medium of the present invention.

FIG. 1 shows the principle of the constitution of the optical disc medium of the present invention, illustrating the lamination relationships between the respective layers in the medium, wherein the numeral 1 is a transparent substrate made of a plastic or a glass, is a thin information recording layer formed on the substrate 1, 3 is a transparent optical interference layer formed on the information recording layer 2, and 4 is an optical reflection layer formed on the optical interference layer 3; and as in a conventional manner, a protective film layer 5 is usually formed on these layers to provide an optical disc medium.

Figure 2:
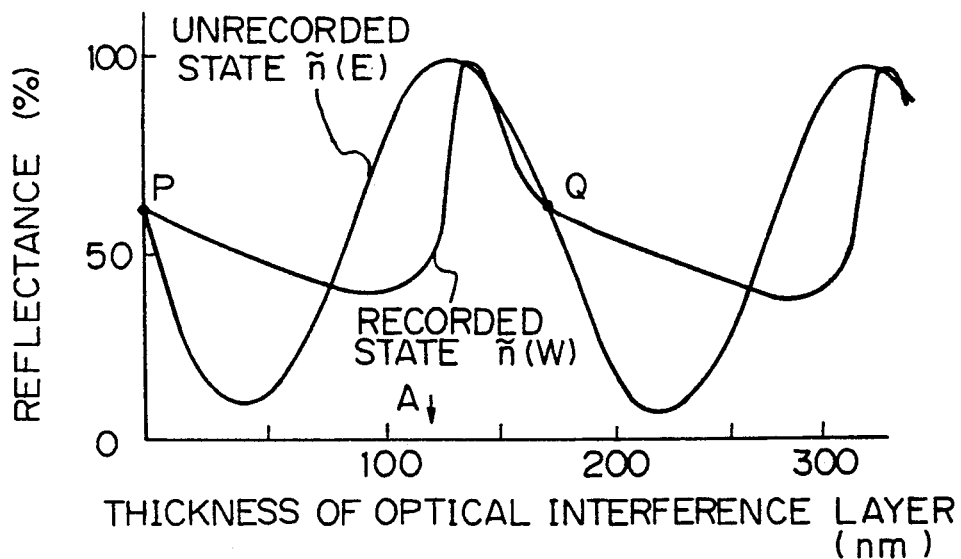
FIG. 2 is a graph showing the relationship between the reflectance and thickness of the optical interference layer in the information recorded or unrecorded state (erased state)

The optical constant of the information recording layer 2 is changed by laser irradiation, and when the optical constant in the information recorded state is made $\bar{n}(W)$, and the optical constant in the information erased or unrecorded state is made $\bar{n}(E)$, when a structure shown in FIG. 1 is adopted, the reflectance can be made higher in the case of $\bar{n}(E)$ and lower in the case of $\bar{n}(W)$. FIG. 2 is a graph of this effect, and shows the relationship between the thickness of the optical interference layer 3 and the reflectance measured through the substance 1, obtained by varying the thickness of the optical interference layer 3 when the optical constant of the information recording layer 2 is $\bar{n}(E)$ and $\bar{n}(W)$. It is easily understood that, by using the thickness of the optical interference layer shown by A in the graph, the reflectance can be made higher in the information erased or unrecorded state of (optical constant: $\bar{n}(E)$), and the reflectance can be made lower in the information recorded state (optical constant: $\bar{n}(W)$). This graph repeats the points PQ as one periodical cycle.

As the substrate 1 of the optical disc medium according to the present invention, any transparent material used as an optical disc substrate in the prior art can be used, without limitation, including, for example, plastic substrates such as polycarbonate, polymethyl methacrylate (PMMA), and glass substrates.

In the present invention, as the information recording layer 2, for example, In-Sb or alloys containing the same, and Te-Ge or alloys containing the same, can be included as representative examples, and the thickness thereof is preferably 5 to 20 nm, more preferably 10 to 15 nm, in view of the film formability and the desired functions.

Typical examples of such materials are:

$$(In_{100-x}Sb_x)_{100-y}M_y$$

wherein x is 50 23 X≦70 (atomic %), y is 0 ≦y ≦40 (atomic %), and M is Al, Si, P, Zn, Ga, Ge, Ce, As, Se, Ag, Cd, Sn, Te, Tl, Bi, Pb, Mo, Ti, W, Au, and/or Pt.

In the case of Te-Ge type alloy thin film, typical examples are:

$$(Te_{100-x}Ge_x)M'_y$$

wherein x is 20 ≦x ≦60, Y is 0 ≦Y ≦50, and M' is Al, Si, P, Zn, Ge, Ce, As, Se, In, Sb, Ag, Cd, Sn, Tl, Bi, Pb, Mo, Ti, W, Au, and/or Pt.

In the present invention, as the optical interference layer 3, for example, ZnS, SiO$_2$, MgF$_2$, MgO or an inorganic material composed mainly of these compounds, and an organic material such as silicone type resin, stearic acid type salt, phthalocyanine, and silylated polymethyl silsesquioxane can be used. In the present invention, as the optical reflection layer 4, a metal thin film having a reflectance of 70% or higher, preferably 90 to 100%, particularly of Au, Ag, Cu, Al or containing these elements as the main component, or a metal having a low thermal conductivity such as In, Be, Ti, Sb, or a metal thin film composed mainly of these elements can be used. The film of the reflection layer 4 must be thick enough to prevent an optical permeation therethrough, and generally, a thickness of about 100 to 200 nm is preferred. Also, the optical reflection layer 4 is not limited to a metal layer, and may be a preparation according to the method in which a reflectance with respect to a specific wavelength is made greater by interference with a multi-layer film.

The protective layer 5 in the present invention can be made of any desired material used in the optical disc medium of the prior art. A specific example thereof is a photocurable resin.

The optical disc medium as described above should have a higher reflectance in the unrecorded state (or erased state) than in the recorded state, particularly preferably, a reflectance in the unrecorded state of 70% or higher, and the difference in the reflectance of the recorded portions before and after information is recorded of 20% or more, more preferably 30% to 50%, and this can be easily determined by one skilled in the art from the graph shown in FIG. 2.

The contrast between the reflectance $R_H$ in the erased state and the reflectance $R_L$ in the recorded state is preferably 30% or more. The contrast is defined as follows:

$$\frac{R_H - R_L}{R_H} \times 100$$

The thickness d (nm) of the optical interference layer is determined by the following formula:

$$d = \frac{2.30}{\tilde{n}} (50 + N \times 180) \text{ to } \frac{2.30}{\tilde{n}} (150 + N \times 180) \text{ (nm)}$$

Wherein:
$\tilde{n}$: refractive index of interference layer material, $n = \tilde{n} + ik$
N: 0 or positive integer (preferably 0 to 50)

and the preferable thickness d is determined by the following formula:

$$d_1 = \frac{2.30}{\tilde{n}} (80 + N \times 180) \text{ to } \frac{2.30}{\tilde{n}} (140 + N \times 180) \text{ (nm)}$$

For reference, when the same graph as shown in FIG. 2 was determined for an optical disc substrate having Au at a thickness of 60 nm as the optical reflection layer 4, ZnS as the optical interference layer 3, and In-Sb at a thickness of 5 nm, 10 nm, 15 nm, and 20 nm, respectively, as the recording layer on a PMMA substrate, the results as shown in FIG. 4 (a), (b), (c), and (d) were obtained.

As described above, and as described in the following Examples, by using the optical disc medium according to the present invention, it is possible to prepare an erasable or rewritable optical disc which can be used in place of a standard CD medium, which was impossible in the prior art.

EXAMPLES

The present invention will now be further illustrated by, but is by no means limited to, the following Examples.

EXAMPLE 1

Figure 3:
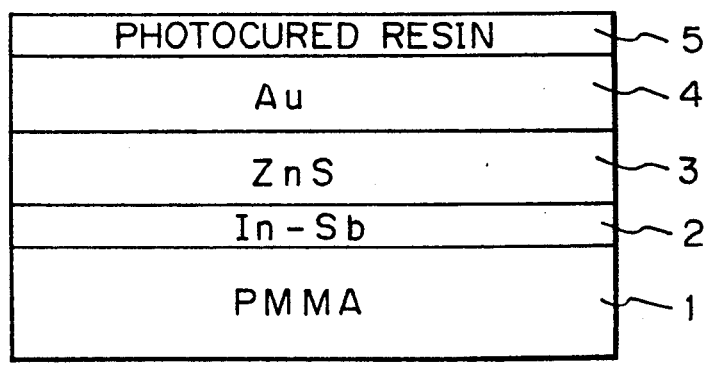
FIG. 3 shows an embodiment of the constitution of the present invention.
Figure 4A:
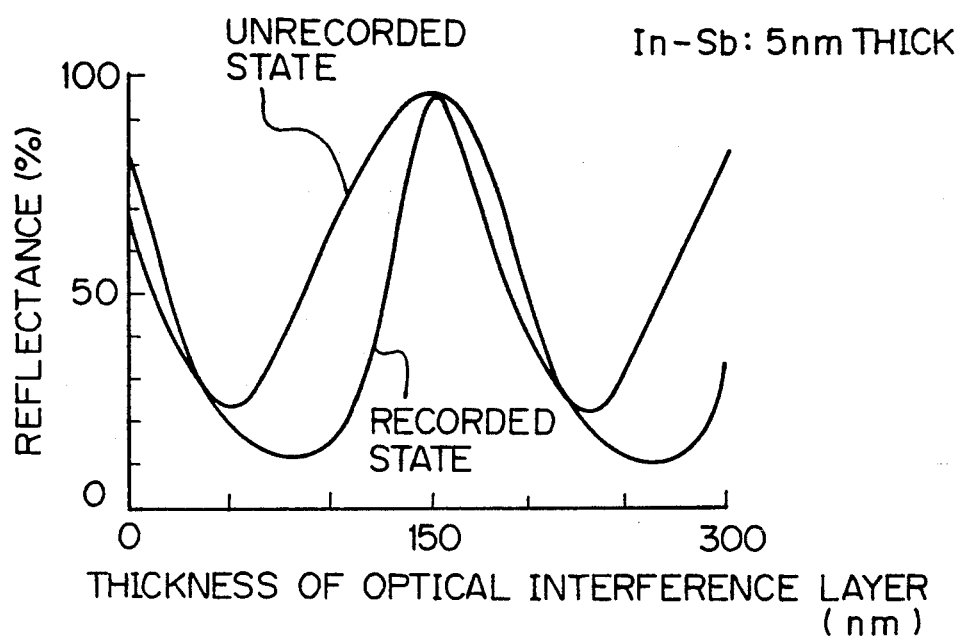
FIGS. 4 (a), (b), (c) and (d) are graphs showing the relationships between the reflectance and optical interference layer when the thickness of the recording layer (In-Sb) is varied.
Figure 4B:
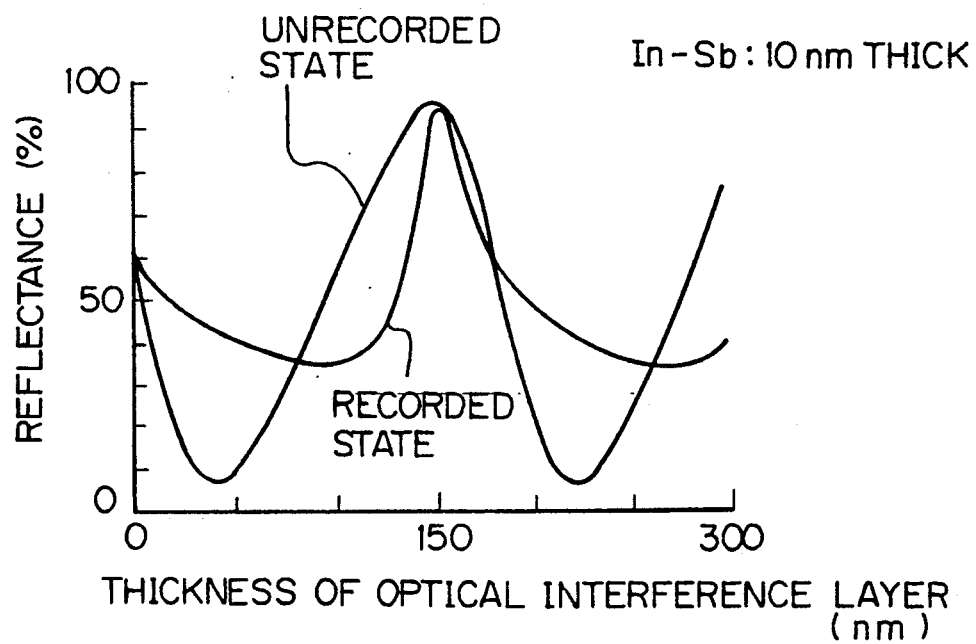
Figure 4C:
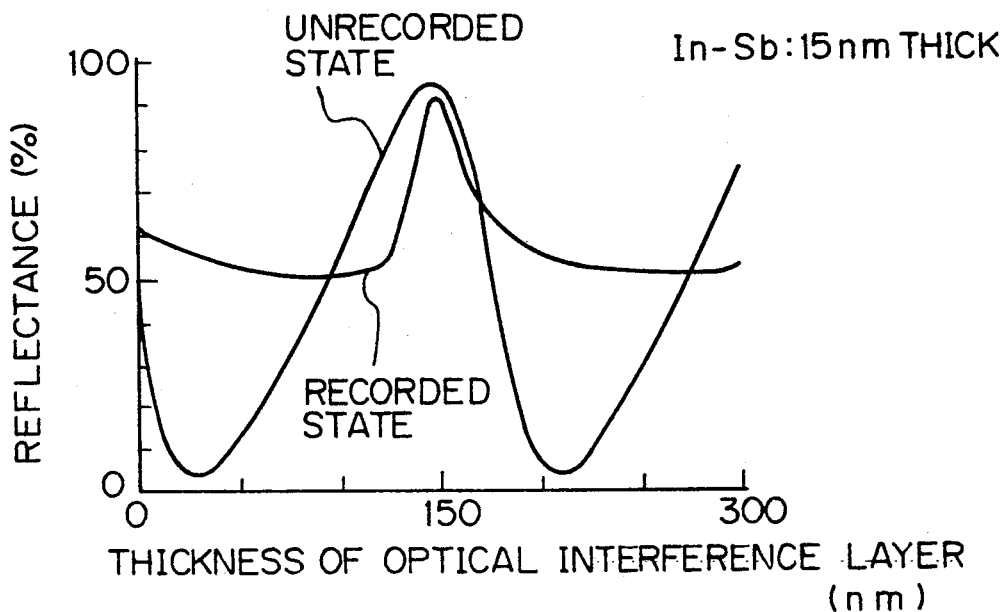
Figure 4D:
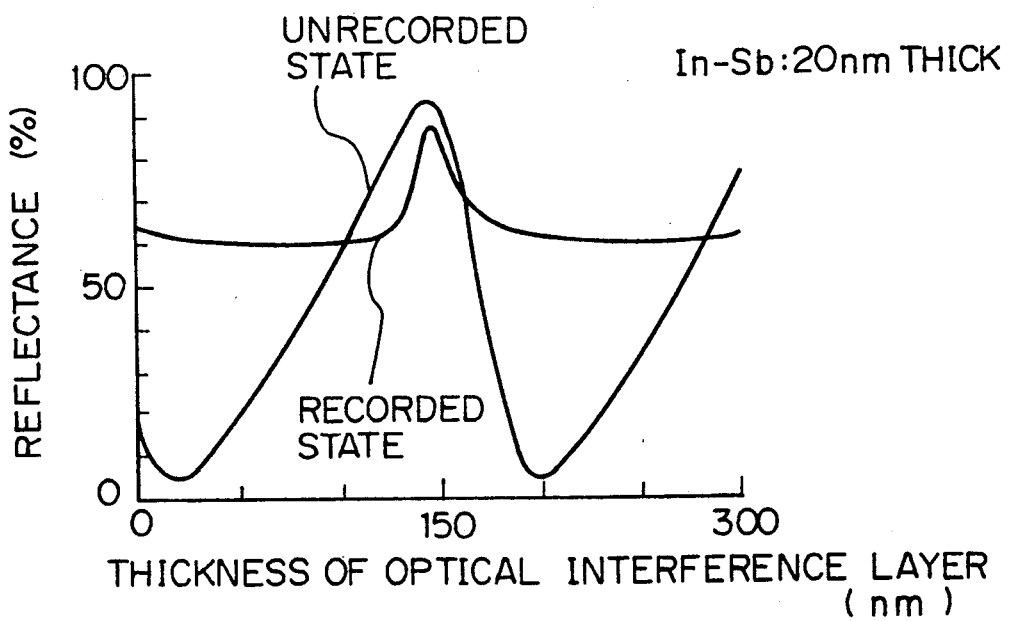

FIG. 3 is a sectional view showing an embodiment of the optical disc medium of the present invention.

For example, a transparent substrate 1 made of polymethylmethacrylate (PMMA), an In-Sb information recording medium 2, a ZnS optical interference layer 3, an Au reflection layer 4, and a UV-ray curable protective layer 5 were constituted in that order from the lower portion on which the laser beam is incident.

The transparent substrate 1 made of PMMA had a thickness of 1.2 mm, a refractive index of 1.50, and was pregrooved at a pitch of 1.6 μm, a groove width of 0.8 μm, and a groove depth of 80 nm on the upper part, (not shown).

The In-Sb recording layer 2 (In: 40 atomic %, Sb: 60 atomic %) had a film thickness of 10 nm; the optical constant before writing being n(E) =4.1 +i ×1.6, and the optical constant after writing being ñ(W) =5.0 +i ×70.

The ZnS (ñ =2.3) optical interference layer 3 had a film thickness of 120 nm. This thickness is determined by the change in reflectance in the writing and erasing state when the thickness was changed, as shown in FIG. 2.

The Au reflection layer 4 had a film thickness of 200 nm, and therefore, a laser beam could not permeate therethrough.

The protective layer 5 was prepared by applying a UV-ray curable resin by spin coating, to a thickness of 50 μm.

An optical disc medium having a film constitution as described above was prepared and mounted on a disc drive device to test the writing of information.

The reflectance of the medium surface in the unrecorded state was 72%. Information was written by laser beam irradiation while rotating the medium at a constant linear velocity of 1.2 m/S. The writing power of the laser was 5.5 mW. When the reflectance at the portion where information was written in this state was measured, it was found to be 38%, and thus showed a lowered reflectance.

The information recorded on the medium was written in the same format as for a CD, and when the disc was mounted on a conventional CD player, the information was reproduced.

The optical disc medium thus recorded was mounted on the previous disc driving device for an erasure of the information, and a beam with a laser power of 3.5 mW was irradiated on the information recorded portion, three times, to effect erasure. When the medium was again mounted on the CD player for information reproduction, the information was not reproduced. Then, the optical disc medium, erased information by the above erasing process, was mounted on the disc drive device to test rewriting of information, i.e., information was written by laser beam irradiation with a laser power of 5.5 mW. When the medium was again mounted on the CD player for information reproduction, the information could be reproduced.

EXAMPLE 2

When the above medium was prepared by using a ($Te_{62}$-$Ge_{38}$) thin film with a thickness of 10 nm as the information recording layer 2, information could be recorded by the disc drive device and reproduced by the CD player.

EXAMPLE 3

Using a $SiO_2$, $MgF_2$ or MgO inorganic thin film layer as the optical interference layer 3, the same characteristics as of the above medium were obtained.

EXAMPLE 4

Using an organic thin film layer of a silicone type resin or a stearic acid type salt as the optical interference layer 3, the same characteristics as of the above medium were obtained.

EXAMPLE 5

When silylated polymethyl silsesquioxane was used as the organic thin layer, the same effect was obtained.

EXAMPLE 6

When a metal thin film composed mainly of Ag, Cu or Al was used instead of the Au single substance used as the optical reflection layer 4, the same effect was obtained.

EXAMPLE 7

When a metal thin films composed mainly of In, Ti, Bi or Sb, was used as the optical reflection layer 4, the writing power was slightly reduced to 4.5 mW.

As described above, according to the present invention, a phase change type optical disk can be formed which can be used in place of a commercially available CD medium, and a medium having characteristics hitherto unobtainable can be prepared.

We claim:

1. An erasable optical disc medium on which information is recorded and read by using a laser beam, said medium comprising:

a phase transition type information recording layer formed on a transparent substrate and comprising at least one material selected from the group consisting of:

($In_{100-x}Sb_x$)$_{1200-y}M_y$, wherein $50 \leq X \leq 70$ (atomic %), $0 \leq y \leq 40$ (atomic %) and M is one of Al, Si, P, Zn, Ga, Ge, Ce, As, Se, Ag, Cd, Sn, Te, Tl, Bi, Pb, Mo, Ti, W, Au, and Pt; and ($Te_{100-x}Ge_x$)$M'_y$, wherein $20 \leq X \leq 50$, $0 \leq y \leq 50$, and M' is one of Al, Si, P, Zn, Ge, Ce, As, Se, In, Sb, Ag, Cd, Sn, Tl, Bi, Pb, Mo, Ti, W, Au, and Pt;

an optical interference layer formed on said information recording layer, a thickness d (nm) of said optical interference layer is $$\frac{2.30}{\bar{n}} (50 + N \times 180) \text{ to } \frac{2.30}{\bar{n}} (150 + N \times 180),$$

wherein $\bar{n}$ is a refractive index of an interference layer material and N is 0 or a positive integer; and an optical reflection layer formed on said optical interference layer, the transparent substrate being in a state such that a reflectance of the medium is higher before information is recorded and a reflectance of the recorded portions of the medium is lower after recording, the reflectance of the medium is an unrecorded state or erased state is 70% or higher; and the difference in the reflectance of the recorded portions before and after information is recorded is at least 20%.

2. An optical disc medium as claimed in claim 1, wherein said information recording layer comprises a phase transition type thin film layer, a crystal state of which is changed by laser irradiation.

3. An optical disc medium as claimed in claim 1, wherein said information recording layer is mainly composed of a crystalline-to-crystalline phase transition material.

4. An optical disc medium as claimed in claim 1, wherein said information recording layer comprises a thin film having a film thickness of from 5 to 20 nm.

5. An optical disc medium as claimed in claim 1, wherein said optical interference layer is an inorganic thin film layer or an organic thin film layer which is transparent at the film thickness used.

6. An optical disc medium as claimed in claim 1, wherein said optical reflection layer has a reflectance of at least 70%.

7. An optical disc medium as claimed in claim 1, wherein said optical interference layer comprises, as a main component, one of ZnS, $SiO_2$, $MgF_2$, and MgO.

8. An optical disc medium as claimed in claim 1, wherein said optical interference layer comprises one of silicone resin, stearic acid type salt, phthalocyanine, and silylated polymethyl silsesquioxane.

9. An optical disc medium as claimed in claim 1, wherein said optical reflection layer is a metallic thin film comprising mainly one of Au, Ag, Cu, and Al.

* * * * *

UNITED STATES PATENT AND TRADEMARK OFFICE
CERTIFICATE OF CORRECTION

PATENT NO. : 5,144,618
DATED : SEPTEMBER 1, 1992
INVENTOR(S) : YASUYUKI GOTO ET AL.

It is certified that error appears in the above-identified patent and that said Letters Patent is hereby corrected as shown below:

Col. 3, line 7, "50 23 x ≤ 70" should be --50 ≤ x ≤ 70--;
        line 66, "n" should be --ñ--;
        line 67, "ñ+ik" should be --n+ik--.

Col. 4, line 44, "n(E)" should be --ñ(E)--.

Col. 5, line 23, "$(Te_{62}-Ge_{38})$" should be --$(Te_{62}-Ge_{38})_{80}Sb_{20}$--.

Col. 6, line 6, "$(In_{100-x}Sb_x)_{1200-y}M_y,$" should be

--$(In_{100-x}Sb_x)_{100-y}M_y,$--;

line 10, "20 ≤ x ≤ 50," should be --20 ≤ x ≤ 60,--.

Signed and Sealed this

Nineteenth Day of October, 1993

Attest:

BRUCE LEHMAN

Attesting Officer      Commissioner of Patents and Trademarks